Figures 1, 2:
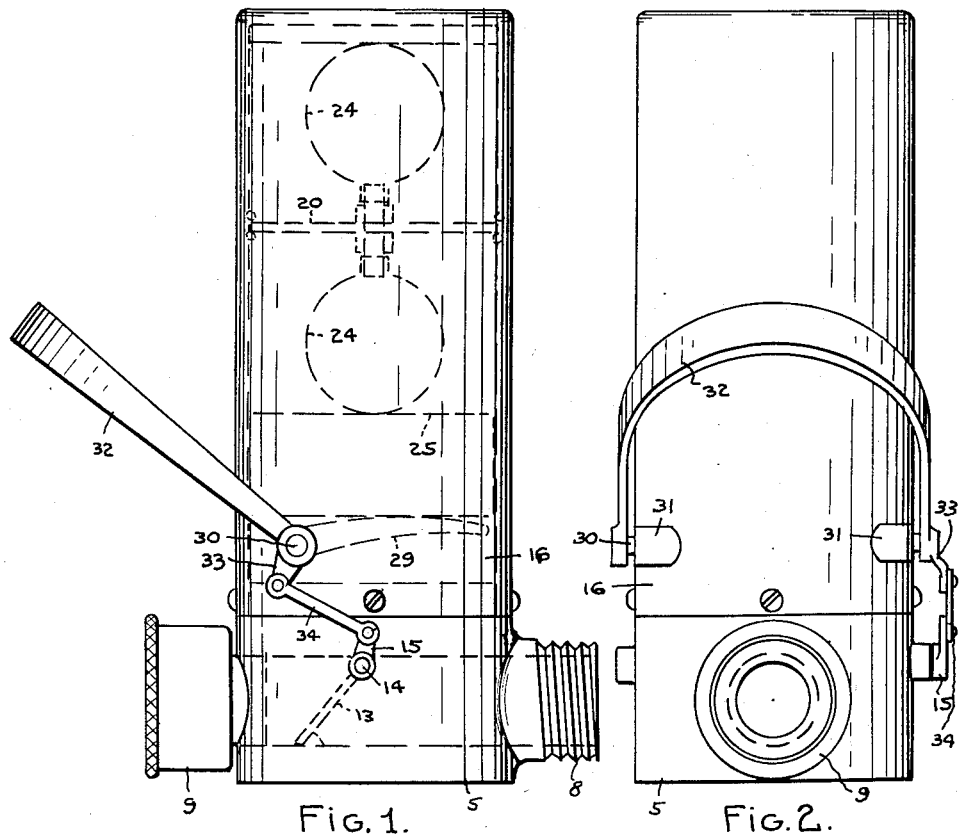

March 15, 1960 J. W. HEINICKE 2,928,644
TIMER DEVICE FOR FLUID CONTROL MECHANISM
Filed Dec. 22, 1958 2 Sheets-Sheet 1

INVENTOR.
JULIUS W. HEINICKE
BY
ATTORNEY

March 15, 1960   J. W. HEINICKE   2,928,644
TIMER DEVICE FOR FLUID CONTROL MECHANISM
Filed Dec. 22, 1958   2 Sheets-Sheet 2

INVENTOR.
JULIUS W. HEINICKE
BY
ATTORNEY

United States Patent Office 2,928,644
Patented Mar. 15, 1960

2,928,644

TIMER DEVICE FOR FLUID CONTROL MECHANISM

Julius W. Heinicke, Hollywood, Fla., assignor to Adok, S.A., Mexico City, Mexico Application December 22, 1958, Serial No. 781,991

3 Claims. (Cl. 251—54)

This invention relates to a flow control device for controlling the flow of fluids in a timed cycle.

The invention contemplates a timer element that is actuated by a hand lever and with the timer element when so actuated controlling a cut-off valve that is disposed within a conduit formed within the device and with the cut-off valve being simultaneously shifted to the open position when the hand lever is actuated to energize the timing element.

The invention further contemplates a novel form of timer element that comprises a pair of communicating expandable bodies and with means for compressing one of the bodies to force a confined fluid to the other aforesaid bodies, causing the same to expand and with check means disposed within the communicating means whereby to retard the reverse flow of the fluid and whereby to reverse the compressing mechanism and to shift the cut-off valve to a closed position.

A further object of the invention resides in a timer mechanism embodying upper and lower expandable fluid containing bodies and with each of the bodies being disposed in upper and lower chambers and with the bodies being connected with a communicating conduit and with a compressing mechanism whereby to compress the lower body to project its confined fluid through the conduit to the upper body where it expands the upper chamber and a check valve to control the flow of fluid from the expanded upper body to the lower body and with the check valve having a bleed tube whereby the contracting force of the upper body functions to provide a reverse flow of the fluid to the lower body in minute quantities whereby the upper and lower bodies assume their normal circumference and with compressing means for compressing the lower body that is manually controlled and movable in a reverse direction by the bleeding of the fluid from the upper body to the lower body, coupled with a closure valve and linkage between the manually controlled mechanism whereby, when the lower body assumes its normal shape, it will actuate the closure valve to a closed position to interrupt the flow of fluid through the device.

Novel features of construction and operation of the device will be more clearly apparent during the course of the following description, reference being had to the accompanying drawings, wherein has been illustrated a preferred form of the device and wherein like characters of reference are employed to denote like parts throughout the several figures.

Figure 3:
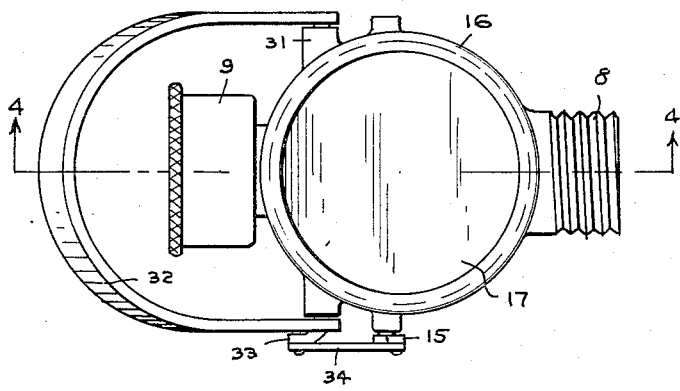
Figures 4, 5:
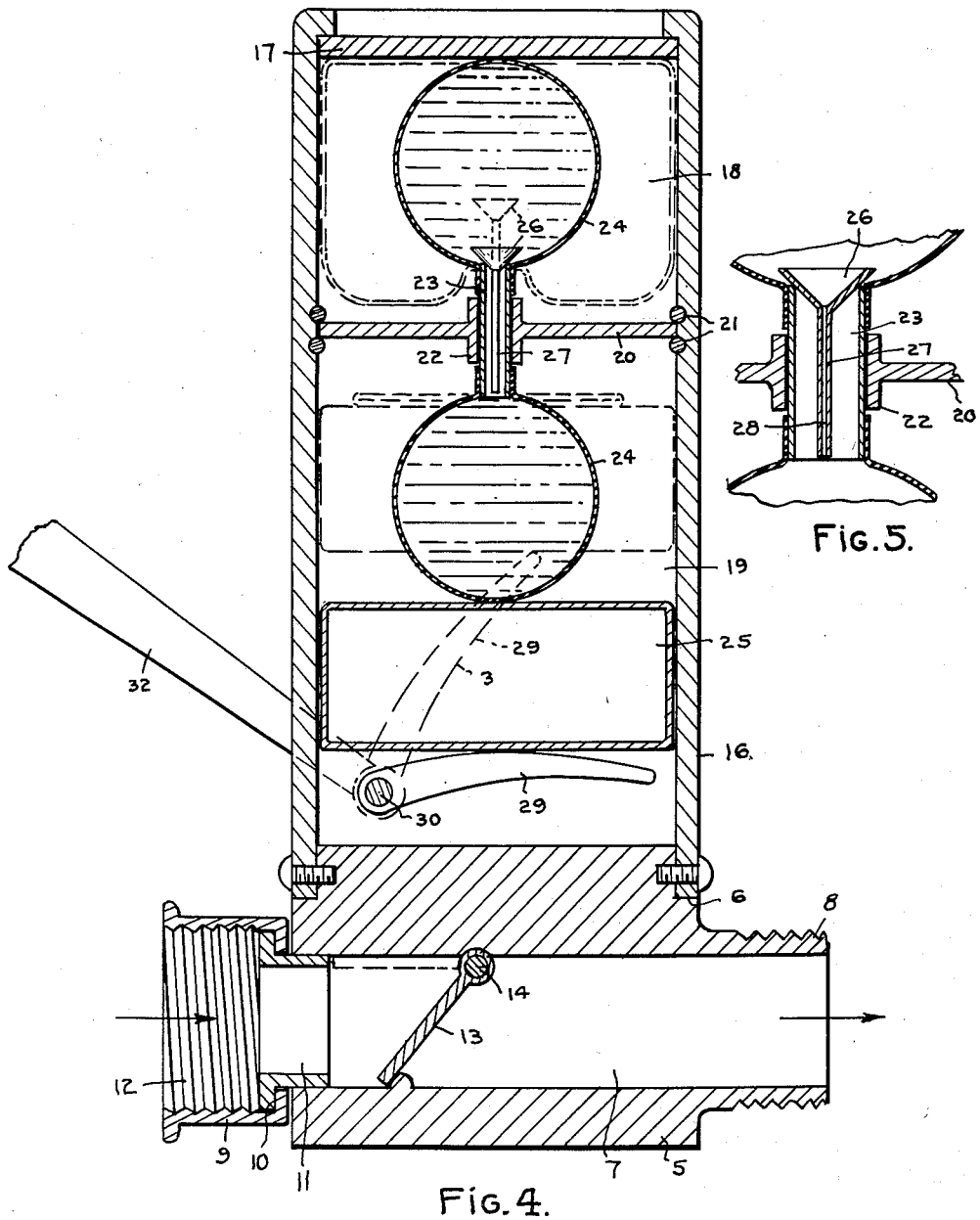

In the drawings:

Figure 1 is a side elevation of a device constructed in accordance with the invention, Figure 2 is a side elevation taken at right angles to that of Figure 1, Figure 3 is a top plan view thereof, Figure 4 is a slightly enlarged vertical section taken on line 4—4 of Figure 3 and, Figure 5 is an enlarged fragmentary section illustrating the communicating tube between the expandable bodies and the check valve mechanism having a ported stem of reduced diameter.

Referring specifically to the drawings, the numeral 5 designates a base member that is preferably a casting and preferably of a cylindrical form. The base 5 is reduced in diameter at its upper end to form a shoulder 6. Extending transversely through the base 5 is a preferably cylindrical bore 7, terminating at one side of the base in a threaded nipple 8. The opposite end of the bore is preferably provided with a female connector 9, rotatable upon a shoulder 10 of a nipple 11 that has either a drive engagement within the end of the conduit 7 or, the nipple obviously may be threaded. The coupling 9 is in the form of a conventional hose coupling having internal threads 12. Mounted within the conduit 7 is a flat valve 13, fixed upon a cross-shaft 14. The shaft 14 has suitable bearings within the side walls of the base and projects at one end, to receive a crank 15 whereby the valve may be shifted to and from a spanning position with respect to the bore 7.

Mounted upon the base 5, and resting upon the shoulder 6 is a preferably cylindrical casing 16, that is closed at its upper end by a plate 17. The casing 16 is divided into upper and lower chambers 18 and 19, by a partition 20, that is held in position by conventional snap rings 21. The partition 20 is provided with a tubular guide 22, arranged axially thereof. Engaged within the guide 22, is a relatively large tube 23 open at its upper and lower ends. Fixedly connected to the upper and lower ends of the tube 23 are preferably spherical elastic hollow bodies 24. The upper body 24 normally engages the closure plate 17, while the lower body 24 normally engages a compressor piston 25. The bodies are preferably filled with fluid having a relatively high viscosity so that each of the bodies in their normal shape will be substantially identical. Vertically shiftable within the tube 23, is a check valve 26, that normally rests upon the upper end of the tube 23 and normally shifted in a vertical direction when the body 24 is compressed by the piston 25 to expel its fluid upwardly to the upper body 24. The check valve 26 is provided with a depending stem portion 27 having a relatively minute bore 28, through which the fluid in the upper body 24 may gradually feed downwardly into the lower body 24 at a predetermined rate to the point, where both bodies 24 assume their normal shapes and their normal fluid supply.

The piston 25 is freely slidable in a vertical direction within the casing 16 under the influence of an arcuate arm 29, fixed upon a cross-shaft 30, that extends outwardly beyond the outer side walls of the casing 16, through bearings 31. Fixedly connected upon the shaft 30, is a substantially U-shape crank 32 and through the medium of which, the shaft 30 is rocked upon its axis to cause the arm 29 to bear against and shift the piston 25 upwardly in the compressing action for the lower body 24. One side of the crank 32 is provided with a short lever 33, that is connected with the crank 15, by a link 34.

*Operation*

Assuming that the device is to control the flow of water, as in a sprinkler system, the conventional hose is connected to the coupling 9 and the nipple 8. Water is then directed into the hose to flow in the direction of the arrows indicated in Figure 4. With the valve 13 in the closed position as illustrated in Figure 4, the flow of water will be interrupted through the bore 7. Now, when a sprinkler device is to be actuated for a predetermined length of time, the lever 32 is shifted downwardly, causing the arm 29 to be elevated and to force the piston 25 upwardly, where it engages and compresses the lower body 24, forcing its fluid in a relatively large volume through the tube 23 to the upper body 24, causing the upper body to expand and substantially fill the chamber 18 as indicated by broken lines. The upper flow of the fluid causes the check valve 26 to be elevated for a free flow of the fluid and, upon the release of the compressive action of the piston 25, the check valve 26 will drop to a check position upon the top of the tube 23. When the crank 32 is swung downwardly, the link 34 actuates the crank 15, swinging the valve 13 upwardly to its open position to permit of a full flow of the water to the sprinkler. Since the upper body 24 has been expanded, a considerable pressure has been exerted thereon by the confined fluid and gradually, the fluid is forced downwardly through the restricted bore 28 of the stem 27, again directing fluid to the lower body 24 and forcing the piston 25 downwardly. As the piston 25 descends, the link 34 gradually moves the valve 13 into the line of flow of the water and, in such position, the force of the water will cause the valve 13 to snap to a closed position, moving the crank 32 upwardly and further freeing the piston 25. The device thus offers a novel form of timer control for controlling the flow of various fluids and the rate of discharge from the upper body 24 to the lower body 24 will be determined by the diameter of the bore 28. It has been found desirable to employ a relatively high viscosity oil as the medium for charging the bodies 24. The timer device herein illustrated and described may have a wide application for the control of fluids and other apparatus, such as electrical switches, or the like and is not confined to the operation of a fluid closure valve. The structure is simple, cheap to manufacture and is highly effective as a simple time control unit.

It is to be understood that the invention is not limited to the precise construction shown, but that changes are contemplated as readily fall within the spirit of the invention as shall be determined by the scope of the subjoined claims.

Having decribed by invention, what I claim as new and desire to secure by Letters Patent is:

1. In combination, a movable control element, a time controlled device for actuating said movable control element, comprising a casing closed at its upper end, the casing being partitioned to form upper and lower chambers, a tubular guide carried by the partition centrally thereof and communicating with the upper and lower chambers, a slightly longer tube positioned in the guide to extend above and below the guide and to extend into the chambers, the tube being open throughout, resilient and expandable spherical fluid containing bodies connected to the upper and lower ends of the tube, respectively, whereby to dispose the bodies in the chambers to be separated by the partition, the tube having an upwardly opening check valve at the upper end and with the check valve having a slender ported stem extending into the tube, a piston movable vertically in the casing to engage and compress the lower body and to expel its fluid contents into the upper body, the check valve being unseated when the fluid is expelled from the lower body to expand the upper body, the fluid in the upper expanded body closing the check valve and bleeding its fluid contents through the ported stem to expand the lower body to its original contour and to move the piston downwardly, an arm for moving the piston upwardly and means connected to the arm for actuating the movable control element.

2. In combination, a fluid control valve, a time controlled device for actuating said fluid control valve, a base that is ported throughout for the passage of the fluid, said valve adapted to be moved to and from a spanning position with respect to the port, an upper hollow casing that is connected to the base and with the casing being closed at its upper end, the casing being partitioned transversely to form upper and lower chambers, the partition having a vertically arranged tubular guide, a slightly longer tube disposed within the guide to extend into the upper and lower chambers, the tube being open throughout, the upper end of the tube being normally closed by an upwardly opening check valve and with the check valve having a depending ported stem that extends throughout the major length of the tube, spherical and expandable bodies disposed within the upper and lower chambers, respectively, and with the bodies having connection with the upper and lower ends of the tube whereby the tube communicates with the interior of each of the bodies, each of the bodies being filled with a fluid of high viscosity, a piston vertically movable in the casing to engage and compress the lower body for expelling its fluid contents through the tube and into the upper body whereby to expand and pressurize the fluid in the upper body, a hand crank, a shaft extending through the casing and carrying the hand crank, a cam arm fixed to the shaft within the casing to engage the lower side of the piston whereby the cam arm forces the piston upwardly to compress and expel the fluid from the lower body, the upper body when fully expanded causing the check valve to seat, the fluid contents of the upper body being forced downwardly through the ported stem at a reduced rate to again fill the lower body and to force the piston and its cam arm downwardly and link means connected to the shaft and the first named valve whereby to move the first named valve to and from the spanning relation to the port.

3. The structure of claim 2 wherein the ported base is provided with means for the connection of a fluid line.

References Cited in the file of this patent

UNITED STATES PATENTS

| | | |
|---|---|---|
| 1,304,311 | Heldrick | May 20, 1919 |
| 1,589,640 | Gulick | June 22, 1926 |
| 2,552,479 | Copping | May 8, 1951 |

FOREIGN PATENTS

| | | |
|---|---|---|
| 255,872 | Great Britain | Feb. 10, 1927 |